United States Patent [19]

Schulz et al.

[11] Patent Number: 4,872,359

[45] Date of Patent: Oct. 10, 1989

[54] PIVOTATION DEVICE FOR A CENTRIFUGAL CHAIN ASSEMBLY IN A MOTOR VEHICLE

[76] Inventors: Gerd Schulz, Besselstrasse 9; Hans-Peter Hertleif, Rotbergskamp 20c, both of 2100 Hamburg 90, Fed. Rep. of Germany

[21] Appl. No.: 888,458

[22] Filed: Jul. 21, 1986

[30] Foreign Application Priority Data

Jul. 20, 1985 [DE] Fed. Rep. of Germany ....... 3525981

[51] Int. Cl.$^4$ .............................................. F16H 21/44
[52] U.S. Cl. .................................... 74/109; 92/117 A; 92/136; 188/4 B
[58] Field of Search .................. 74/109, 89.17, 89.19, 74/109, 416, 417, 422; 92/117 R, 117 A, 134, 136; 188/4 B

[56] References Cited

U.S. PATENT DOCUMENTS

| 41,586 | 2/1864 | Wright | 92/117 A |
|---|---|---|---|
| 577,342 | 2/1897 | Bain | 92/117 R |
| 1,374,252 | 4/1921 | Thorne et al. | 188/4 B |
| 1,850,070 | 3/1932 | Booth | 74/422 |
| 2,163,982 | 6/1939 | Mercier | 92/134 |
| 2,255,395 | 9/1941 | Spink | 92/117 A |
| 2,283,948 | 5/1942 | Ridgway | 188/4 B |
| 2,404,639 | 7/1946 | Lane | 92/136 |
| 2,637,787 | 5/1953 | Price | 74/89.17 X |
| 3,338,140 | 8/1967 | Sheesley | 74/422 |
| 3,772,966 | 11/1973 | Mills | 92/117 R |
| 4,506,825 | 3/1985 | Grant | 74/109 |
| 4,530,252 | 7/1985 | Sarges et al. | 74/109 |
| 4,586,392 | 5/1986 | Nilsson | 74/109 X |
| 4,619,151 | 10/1986 | Trachman et al. | 74/89.17 X |
| 4,665,583 | 5/1987 | Frolov et al. | 92/136 |

Primary Examiner—Leslie A. Braun
Assistant Examiner—Janice E. Chartoff
Attorney, Agent, or Firm—Wood, Herron & Evans

[57] ABSTRACT

A pivotation device for a centrifugal chain assembly of a motor vehicle comprises a drive, a rack longitudinally displaceable by the drive, a gear wheel forming with the rack a gearing, an output drive shaft driven by the gear wheel and a pivotation arm, connected thereto by a coupling, for the centrifugal wheel of the assembly. A guide rod of round material extends parallel to the rack, which is guided in a flying manner on the guide rod. The teeth of the rack are located at the side facing away from the guide rod and the gear wheel supporting the rack against a lateral pivotation about the guide rod.

17 Claims, 5 Drawing Sheets

PIVOTATION DEVICE FOR A CENTRIFUGAL CHAIN ASSEMBLY IN A MOTOR VEHICLE

Description

The invention relates to a pivotation device for a centrifugal chain assembly of a motor vehicle, with a drive, a rack longitudinally displaceable by means of the drive, a gear wheel forming a gearing with the rack, an output drive shaft driven by the gear wheel, the axis of rotation of the output drive shaft being the same as that of the gear wheel, and a pivot arm, connected to the output drive shaft by a coupling, for a centifugal wheel of the centrifugal chain assembly.

In the state of the art, numerous known anti-skid devices for motor vehicles are described as centrifugal chain assemblies. They form a winter travel safeguard, employed especially in trucks, which can be engaged when needed by the driver and which substantially improves the traction between the drive wheels and the roadway.

An actuatable winter travel safeguard is adopted, in particular, for commercial vehicles, since their range of action during winter usually extends over both snowy and also over snow-free regions and, when operated with conventional snow chains, very frequent attachment and removal is necessary, which lengthens the transport periods.

Centrifugal chain assemblies, such as are described, for example, in German Laid-Open Specification No. 3,100,975, have a pivotation device, comprising a pivotation arm, on which a centrifugal wheel, provided with chain links, is rotatably mounted, and a drive, which swings the pivotation arm selectively into one of two positions, in one of which the centrifugal wheel is pressed against the sidewall, facing inwardly of the vehicle, of the vehicle wheel so as to be driven thereby, and in the other of which the centrifugal wheel is located in a position, raised from the vehicle wheel, in which the chain links cannot contact the roadway. As a drive for the pivotation device, there serves, according to German Laid-Open Specification No. 3,100,975, a pneumatic cylinder with a piston. The cylinder is supported on a part fixed to the vehicle, while the piston engages the pivotation arm, which is pivotally connected to the vehicle, in the manner of a crank.

With such a construction, its space requirement, which can not always be satisfied, can be a disadvantage. In particular for air-sprung vehicles, the space required is frequently not available, so that the use of centrifugal chain assemblies is prevented.

From U.S. Pat. No. 2,283,948 there is known a centrifugal chain assembly which has a pivotation device of the type mentioned at the beginning. In this pivotation device, the rack is moved to and fro by means of a drive rod connected, if required, with a return spring. The rack engages in a gear wheel, which moves the pivotation arm through the output drive shaft. The single guide for the rack comprises a housing extending closely around its outer surface, which housing also receives the gear wheel. Since the rack is, in practice, not guided by the housing, a costly, dimensionally accurate machining of the rack and the housing is necessary in order to avoid jamming of the rack and engagement errors with the gear wheel. Moreover, this guiding of the rack necessitates a very bulky actuating mechanism. In air-sprung, and in particular small, vehicles such as small transport vehicles and automobiles, this known pivotation device cannot be adopted because of its large space requirement.

It is therefore the object of the present invention to propose an inexpensive, compact and therefore space-saving pivotation device.

The use of a rack/gear wheel drive instead of a pneumatic cylinder with pistons provides the basis for a very compact and space-saving pivotation device to be realized in an inexpensive manner.

Even small longitudinal movements of the rack effect a relatively large angular rotation of the gear wheel and, therewith, also of the output drive shaft and the pivotation arm. The total extent of the pivotation device in the longitudinal direction of the rack can thereby be kept smaller than when a pneumatic cylinder is utilized. The drive itself can act directly in the longitudinal direction of the rack, so that the pivotation arm is the only component which changes its angular position with respect to the remainder of the pivotation device.

To fulfil this object, according to the invention a pivotation device of the first-mentioned type is equipped with a rack/gear wheel drive in such a way that a guide rod of round material is provided, which extends parallel to the rack, the rack is guided in a flying manner on the guide rod and the teeth of the rack are provided on the side facing away from the guide rod, whereby the gear wheel supports the rack against lateral swinging about the guide rod.

Such a support is particularly easy to produce. The rack and the gear wheel are then braced oppositely at the teeth flanks and prevent a rotation of the rack. It is in that case particularly advantageous if the rack has a rectangular cross section with a comparatively large tooth width. The bracing is then effected over a large area of the tooth flanks.

It is advantageous if the rack is urged by means of a spring element against the drive. This spring element then avoids a drive acting in two directions, so that the drive can be particularly economically made.

As the spring element, a commercially available gas pressure spring is particularly suitable, which is either supported at one side in a second blind hole, lying opposite a first blind hole, in the rack, and at the other side, on a part fixed relative to the vehicle and, advantageously, received in the second blind hole, or is coupled by an eccentric linkage to the output drive shaft.

A particularly simple drive results, in a first embodiment of the invention, when a push rod actuated by the drive is coupled to the rack, particularly when this push rod is inserted into a boring in the rack, the boring extending in the axial direction of the rack.

The drive, for example a compressed air cylinder, a hydro-pneumatic cylinder, a manual lever force, etc., acts on the push rod which, in turn, displaces the rack and, thus, rotates the gear wheel.

In a second preferred embodiment, which provides an even more compact manner of construction than the above-mentioned first embodiment, the rack is fixedly arranged at the exterior of a cylinder, which is displaceably guided on the guide rod. The cylinder is provided at each of its end sections with a sealing and guide plate, which tightly surrounds the guide rod. Rotation of the cylinder together with the rack about the guide rod is prevented by the engagement of the rack with the gear wheel. In the interior of the cylinder, there is preferably provided a fixed piston plate, which is tightly surrounded by the inner periphery of the cylinder wall and which therefore divides the internal space of the cylinder into two working chambers.

In this embodiment, the guide rod serves, with particular advantage, both as a supply element for a fluid, with which the cylinder can be moved along the guide rod, whereby it displaces the rack and thereby rotates the gear wheel. The guide rod has two borings extending axially into it from its opposite ends, which borings communicate through lateral openings with respective ones of the working chambers. When a fluid is supplied into one of the working chambers, the sealing and guide plate which defines this working chamber is displaced away from the fixed piston plate. The corresponding working chamber is thereby enlarged, while the other working chamber is correspondingly diminished and the fluid contained in it is expelled through the other boring.

Since in this embodiment all actuating elements (up to the supply hose for the fluid) are accommodated in the smallest space within the housing, a pivotation device of the greatest possible compactness is provided, which can still easily be provided on the vehicle even with very unfavourable space relationships.

In this embodiment, the spring element is advantageously linked to a disk element, which is seated on the output drive shaft. In particular by using a gas compression spring as the spring element, there is given the possibility to so link the actuating rod of the gas compression spring in an eccentric position, near the edge, of the disk element that the gas compression spring passes through its dead center position at about half of the stroke of the cylinder, at which it is most pushed in. Consequently, during driving of the cylinder the gas compression spring is firstly compressed and, in the latter part of the movement of the cylinder, however, the gas compression spring again expands and thus assists the movement of the cylinder. Simultaneously, by its damped, speed-limited expansion, it ensures that the cylinder is not jerked into its end position. This considerably reduces wear phenomena and harmful noise production. It is to be understood that the same effect occurs during the opposite stroke movement of the cylinder.

A construction of the pivotation device is particularly preferred in which the disk element connected to the spring element is seated between two gear wheels on the output drive shaft. Both gear wheels are in toothed engagement with the rack. In the longitudinal middle of the rack there may be provided a longitudinal recess for receiving the disk element, projecting beyond the outer periphery of the gear wheels.

This development provides a highly symmetrical and especially smooth-running construction. It is, furthermore, particularly simple to assemble. The disk element is provided in the housing approximately at the desired position on the rock, whereupon only the output drive shaft has still to be inserted through the slide element. Subsequently, from the sides the gear wheels and then the housing elements are fitted onto the output drive shaft, which elements journal the end sections thereof and are fixed to the housing of the pivotation device. The pivotation arm can then be fitted onto a protruding coupling section of the output drive shaft and fixed thereto.

Also, the connection of the spring element and the disk element is, in this construction, particularly easily and securely produced. For this purpose, the disk element is formed with two disk segments, which enclose therebetween a region of lesser diameter. The actuating rod of the spring element can enter into the resulting peripheral recess. An eccentric boring extends through both disk segments parallel to the axis of rotation and receives a short transverse bolt, which in the assembled condition is held at both ends by the gear wheels enclosing the disk elements. The end of the actuating rod of the spring element is inserted through a transverse boring in the bolt and secured. The assembly of these elements can be effected in the simplest manner when the disk elements and the gear wheels are mounted.

For unfavourable mounting conditions, the pivotation device can not be oriented in any manner. In such cases it is advantageous if the coupling between the output drive shaft and the pivotation arm has bevel gearing. The use of bevel gears for pivotation devices of other types is known from U.S. Pat. No. 1,374,252 and from German Pat. No. 266,487. It is thereby possible to pivot the pivotation arm between any desired, predetermined directions. With the help of such bevel gearing, the same pivotation device can be employed for the left-hand and for the right-hand side of the vehicle. If the bevel gearing is not bolted to the housing, but is rotatably secured by means of a clamping ring, then stepless adjustment and adaptation to the particular mounting situation of the relevant vehicle is possible.

In the following, preferred embodiments of the invention are individually described with reference to the drawings.

The first embodiment of the pivotation device has, according to FIGS. 1 to 5, an approximately quadrilateral housing 10 with two shell parts 12, 13, which are symmetrical with respect to one another, and two substantially flat end plates 14, 15. On the end plate 14 there is arranged a drive 11 in the form of a pneumatic cylinder.

Figure 1:
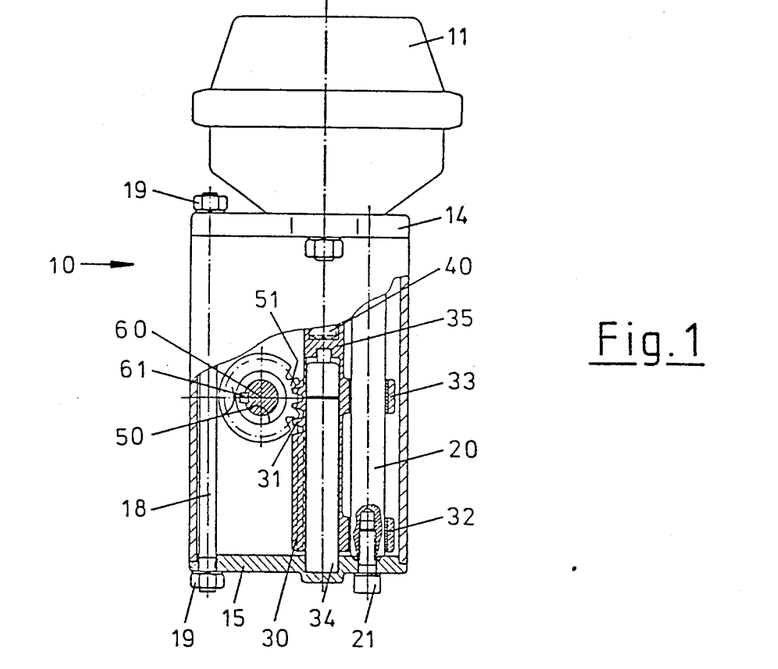
FIG. 1 shows a side elevation, partly in section, of a first embodiment of a pivotation device.
Figure 2:
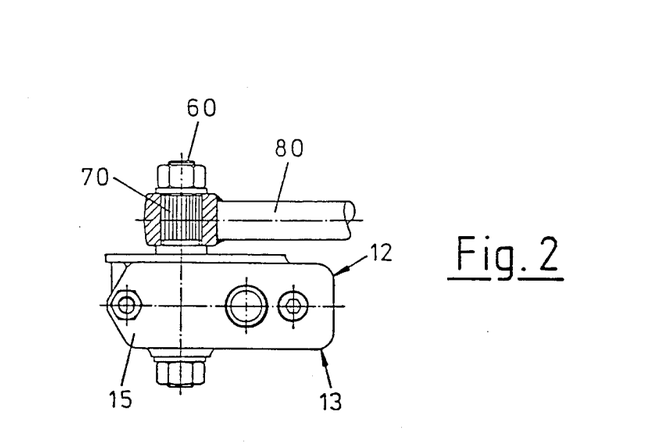
FIG. 2 shows an end elevation of the pivotation device according to FIG. 1.

In the housing 10, parallel to one another and perpendicular to the end plates 14, 15, there are arranged a guide rod 20, a rack 30 and a tension rod 18. The latter projects through both end plates 14, 15 and, by means of nuts 19, urges the end plates against the shell parts of the housing 10. The guide rod 20 is fixedly secured to the end plates 14, 15 of the housing 10 by means of bolts 21, of which only one is visible and which are screwed into threaded borings at the ends of the guide rod 20.

The teeth 31 of the rack 30, which is of square or rectangular cross-section, are located at the side facing away from the guide rod 20.

On the side of the rack 30 facing towards the guide rod 20, two annular projections 32, 33 project radially. The projection 32 is arranged at the end of the rack 30 which is the lower end, in the drawing, and opposite from the drive 11, and the projection 33 is arranged approximately in the middle of the rack 30. The projections 32, and 33 are drilled parallel to the axis of the rack 30 and provided with sleeves. The thus-formed borings are aligned with one another and are penetrated by the guide rod 20. In this way the rack 30 is longitudinally displaceably mounted in a flying manner on the guide rod 30.

From both ends of the rack 30, axially aligned holes extend into the interior thereof, which are separated by a web 35. In the illustrated, preferred exemplary embodiment, the web 35 is made very thin.

In one of the blind holes of the rack 30, facing towards the drive 11, there terminates a push rod 40 which, for example, may be the piston rod of a pneumatic cylinder in the drive 11. The push rod 40 extends axially and is supported on the web 35.

The other blind hole receives a spring element in the form of a gas compression spring 34, which is supported at one side on the web 35 and at the other side on the end plate 15 of the housing 10.

The teeth 31 of the rack 30 mesh with a gear wheel 50, the axis of which is perpendicular to the rods 20, 30. The teeth of the gear wheel 50 engage in the teeth 31 of the rack 30 and, with them form a gearing.

Figure 5:
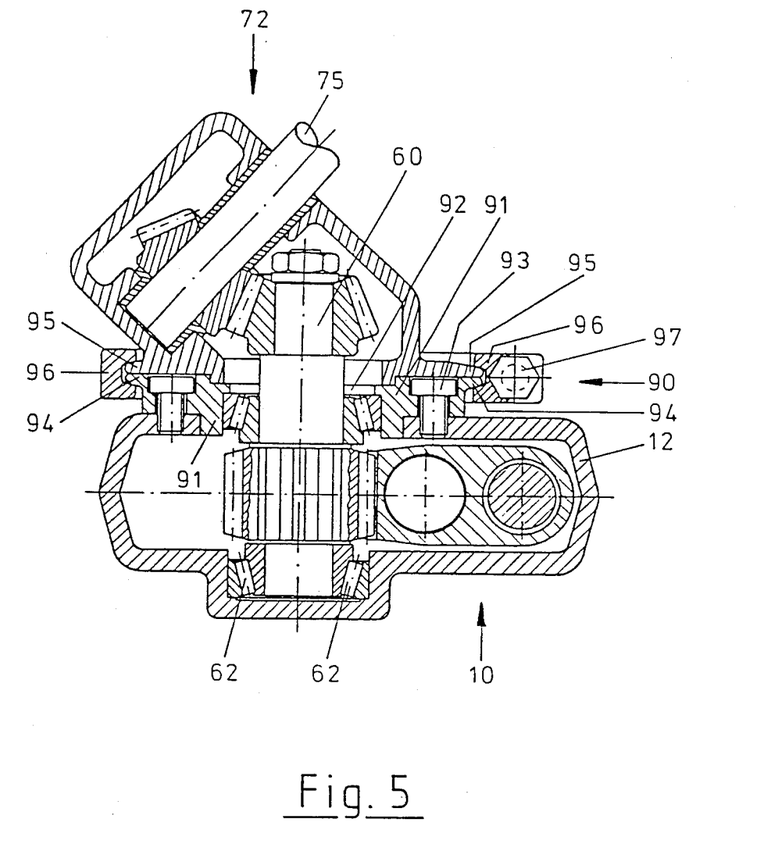
FIG. 5 shows a transverse section through the axis of the output drive shaft of a further modification of the pivotation device.

An output drive shaft 60 is journalled in the shell parts 12, 13 of the housing 10, for example by roller bearings 62 (compare the enlarged illustration of the embodiment according to FIG. 5, which corresponds to that extent with FIGS. 1 to 4). The output drive shaft 60 carries the gear wheel 50. It is connected in a locked manner to the gear wheel 50 by means of a key 61. One end of the output drive shaft 60 projects from the housing 10. A pivotation arm 80 is there fitted onto the output drive shaft 60, with respect to which it extends perpendicularly (only the embodiment of FIGS. 1 and 2).

A coupling 70 connects the output drive shaft 60 to the pivotation arm 80. It comprises a toothing.

The free end of the pivotation arm 80, to which the centrifugal plate with the chain links of the centrifugal chain assembly is fixed, is not illustrated.

The assembly of such a device is as simple as can be conceived. In the lower shell 13, firstly, the journalling of the gear wheel 50 is effected. The drive 11 and the end plate 14 facing the drive 11 are placed in position. The upper shell 12, through which the output drive shaft 60 extends is added. The guide rod 20 and the rack 30 are then inserted through the side which still remains open, whereby it must only roughly be ensured that the push rod 40 enters the blind hole of the rack 30. The gas compression spring 34 is inserted into the second blind hole, and the tension rod 18 is inserted. Finally, the single side of the housing 10 still open is closed by the end plate 15 and the end plate 15 is secured by means of the bolts 21 and the nuts 19. After mounting of the pivotation arm 80 on the output drive shaft 60, the pivotation device is ready for fitting.

The pivotation device is required in respective mirror image arrangements for the two sides of the vehicle. Both arrangements can be realized with the above-described embodiment and with the same components. It is, for this purpose, necessary that the two end plates 14, 15 are each so constructed that they are mirror images of one another in a plane perpendicular to the output drive shaft 60. The pivotation device required for the other side of the vehicle is then simply provided by exchanging the two end plates, fixing the drive 11 with the push rod 40, on the other side of the housing 10, as previously of course on the end plate 14, and assembling the rack 34 the other way around.

The operation of the pivotation device is effected as follows:

In its initial position, the push rod 40 is withdrawn and the compression spring 34 is completely unloaded. The annular projections 32, 33 of the rack 30 are then located in a position above the position illustrated in FIG. 1.

For pivotation of the pivotation arm 80, the drive 11 is firstly actuated. It displaces the push rod 40, this exerts a force on the web 35 and, thereby, on the rack 30 and thus compresses the gas compression spring 34. This movement continues until the position illustrated in FIG. 1 is reached. The teeth 31 of the rack 30, which are engaged with the teeth 51 of the gear wheel 50, are likewise moved downwardly in FIG. 1 and therefore rotate the gear wheel 50 in the clockwise direction. Thereby, the output drive shaft 60 is also rotated in the clockwise direction, and the pivotation arm 80 is swung forwardly in FIG. 2.

In order to bring the pivotation device back into its initial position, the drive 11 is switched off, the force on the web 35 is discontinued and the gas compression spring 34 displaces the push rod 40 together with the rack 30 upwardly (in FIG. 1) and thus rotates the gear wheel 50 in the counterclockwise direction. The output drive shaft 60 is correspondingly rotated and the pivotation arm 80 is swung rearwardly (in FIG. 2).

It is at this point emphasized that, for the above-described pivotation device, only a few surfaces need to be machined. The blind holes in the rack 30 can, for example, be formed by a casting process. The projections 32, 33 can be relatively simply formed and need only to be sleeved in order to be easily slidable on the guide rod 20. Also, no precision machining is necessary for the teeth 31 and 51 of the rack 30 and the gear wheel 50.

Since the entire pivotation device is very easy to operate, a relatively small drive cylinder or a low powered drive assembly may be employed.

Figure 3:
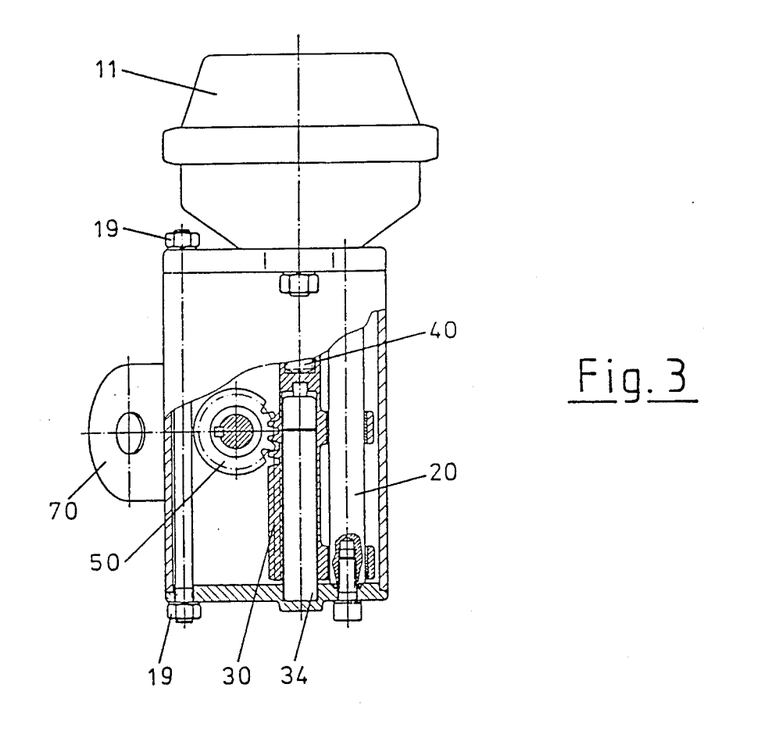
FIG. 3 shows an elevation, similar to FIG. 1, of a modification of the pivotation device.
Figure 4:
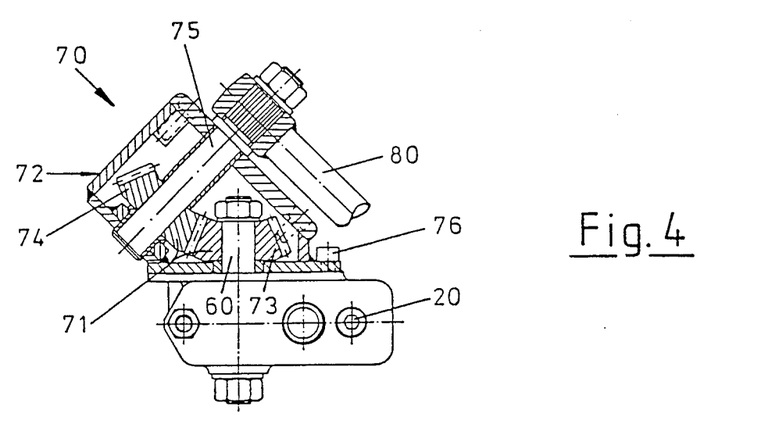
FIG. 4 shows an illustration, corresponding to FIG. 2, of the embodiment according to FIG. 3.

A modification, illustrated in FIGS. 3 and 4, of the first embodiment corresponds substantially to that according to FIGS. 1 and 2. Between the drive shaft 60 and the pivot arm 80 there is, in this case, provided a bevel gearing 71 as a coupling 70.

On the housing 10 there is mounted, at the side at which the output drive shaft 60 projects outwardly, a housing 72, in which the bevel gearing 71 is arranged. The housing 72 is secured on the housing by means of bolts 76. The bevel gearing 71 comprises two bevel gears 73, 74 and an additional shaft 75. The output drive shaft 60 carries the first bevel gear 73. The additional shaft 75 is positioned at a predetermined angle relative to the output drive shaft 60 and is journalled rotatably at its one end in the housing 72. It carries the second bevel gear 74. The two bevel gears 73 and 74 mesh with one another. One end of the additional shaft 75 projects from the housing 72. The pivotation arm 80 is there fitted onto the additional shaft 75.

In FIG. 5 there is illustrated on a larger scale a further modification of the first embodiment, which substantially resembles that of FIGS. 3 and 4. It has, as that does, a housing 72 for the bevel gearing 71. The housing 72 is in this case, however, not retained by bolts but by means of a clamping device mounted on the housing 10.

An annular flange 91 with a central opening 92 is fixedly bolted by means of countersunk screws 93 to the shell part 12 of the housing 10. The output drive shaft 60 projects through the opening 92. The annular flange 91 has, at its end facing away from the housing 10, a radially projecting edge 94 with a circumferential wedge surface.

Also, the housing 72 comprises, at its side facing towards the housing 10, a corresponding circumferential and complementary annular flange 95. By conventional means, it is ensured that the annular flange 91 is centered relative to the output drive shaft 60 in the housing 10 and that the other annular flange 95 is centered relative to the annular flange 94. As shown in FIG. 5, the annular flange 95 also has a circumferential wedge surface.

A radially inwardly peripherally wedge-shaped grooved clamping ring 96 engages over the complementary wedge surfaces of the annular flanges 91, 95. It is radially slotted and tightened by means of a bolt 97 in order to press the annular flanges against one another.

Before being fitted to the vehicle, the clamping ring 96 is locked to an extent such that the housing 72 can still be rotated relative to the annular flange 91. The housing 72, together with the additional shaft 75 and the pivotation arm 80, can still be steplessly rotated relative to the housing 10 and to the drive 11 until the required angular position is reached. The clamping ring 96 is then further tightened by means of the bolt 97 and thus secures the adjusted position of the components.

Figure 6:
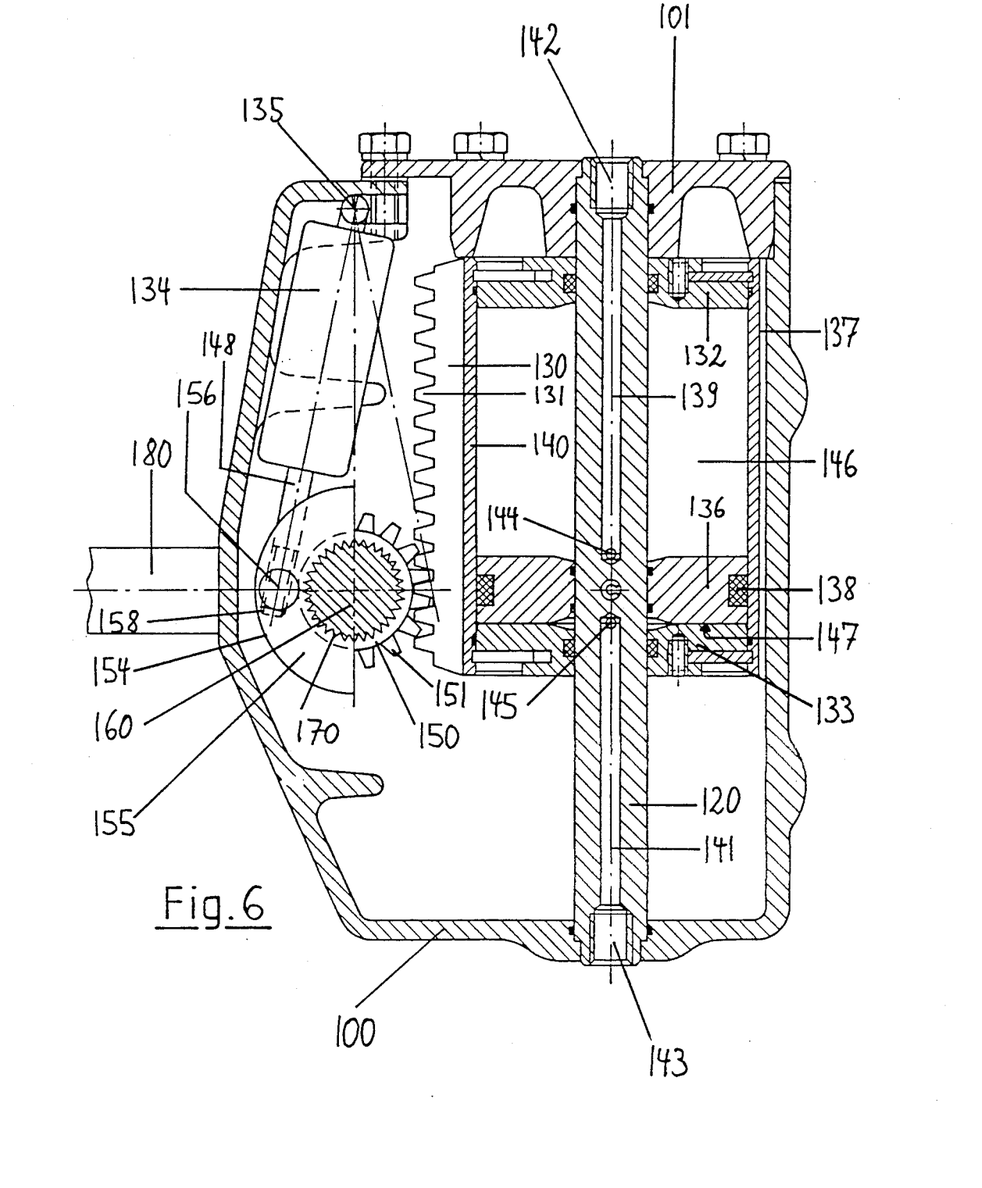
FIG. 6 shows a longitudinal sectional view of a second embodiment of a pivotation device and FIG. 7 shows a transverse section through the axis of the output drive shaft of the pivotation device according to FIG. 6.
Figure 7:
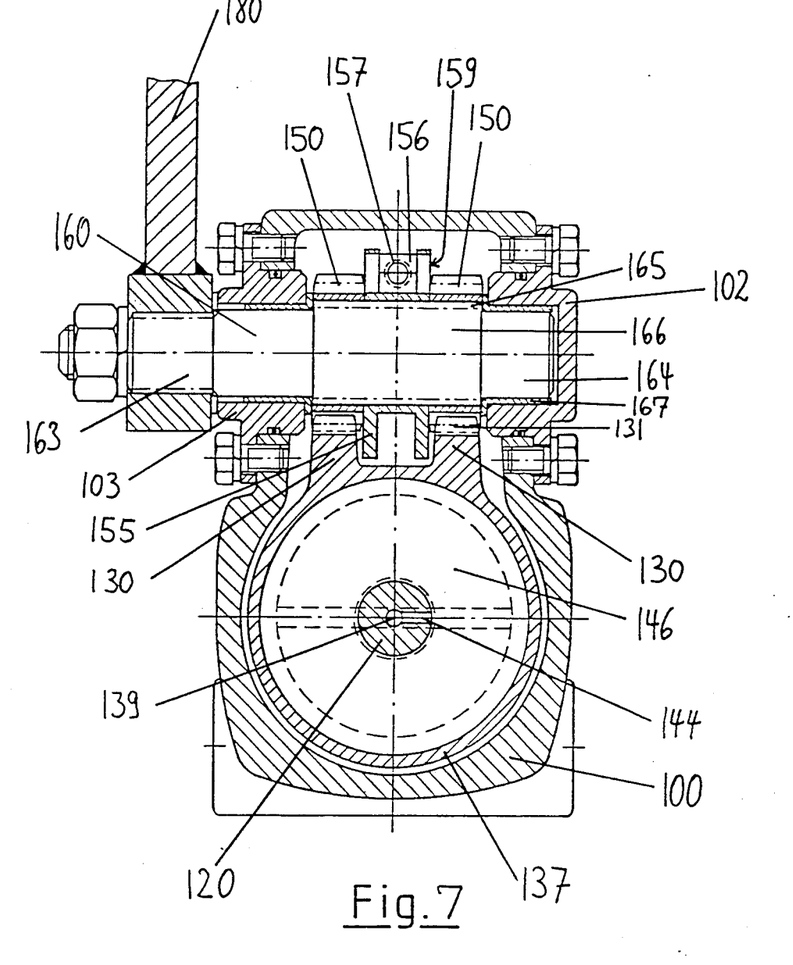

The second embodiment of the pivotation device, shown in FIGS. 6 and 7, includes a housing 100 through which extends a guide rod 120. At one end, the housing 100 has a large opening, which is closed by a housing element 101 bolted to the housing 100. The opening and the housing element 101 closing the opening serve for the assembly of a part of the components forming the pivotation device.

The guide rod 120 has a circularly-shaped cross-section and is, in its assembled condition, held in two through-borings in the housing 10 and the housing element 101. From the ends, blind borings 139, 141 extend to almost the longitudinal midpoint of the guide rod axially into the latter. At the bottom of each blind boring 139, 141 there is provided a transverse boring 144, 145, which extends from the periphery of the guide rod 20 into the blind boring. The blind borings 139, 141 serve as inflow and outflow passages for a fluid which is supplied from connections 142, 143, provided at the ends of the guide rod 120, through the passages 139, 141 and the borings 144, 145, or in the opposite direction.

A cylinder 137 is guided on the guide rod 120 and is displaceable on the guide rod 120 in the longitudinal direction of the guide rod 120 . The cylinder 137 includes a cylindrical wall 140, like a piece of tube, and, at the respective axial ends thereof, tightly secured sealing and guide plates 132, 133. The sealing and guide plates 132, 133 are each drilled at the central regions thereof and fitted onto the guide rod 120, which extends through these holes. The sealing end guide plates 132, 133 are also sealed to the guide rod 120.

The cylindrical wall 140 and the sealing and guide plates 132, 133 enclose an inner space of the cylinder 137, which is divided by a fixed piston plate 136 into two working chambers 146, 147. The fixed piston plate 136 is immovably arranged on the guide rod 120 and lies between the borings 144, 145 of the inlet and outlet passages 139, 141. The outer peripheral profile of the fixed piston plate 136 corresponds substantially to the inner peripheral profile of the cylindrical wall 140; an annular seal 138 recessed in the outer periphery of the fixed piston plate 136 seals with latter relative to the cylindrical wall 140 and, thereby, seals the working chamber 146 relative to the other working chamber 147. The distance over which the cylinder 137 can be displaced along the guide rod 120 is limited by the abutment of the respective sealing and guide plates 132 or 133 against the fixed piston plate 136; in this position, one of the working chambers 146, 147 is of maximum size, while the respective other working chamber has only a minimal residual volume. If the cylinder 137 is displaced from this position, then the volume of the above-mentioned maximum size working chamber is reduced to the extent that the above-mentioned maximally small working chamber is increased.

On the cylinder wall 140, a rack 130 is fixed or integrally arranged at the exterior, the teeth 131 of which lie at the side facing away from the cylinder wall 140.

As FIG. 7 shows, the rack 130 is axially slotted so as to form a central longitudinal recess, so that the toothing 131 is provided only at the longitudinal sides of the rack 130. Thus, two series of teeth, lying adjacent one another in the longitudinal direction, are provided.

Instead of as in the above-described first embodiment, in this second embodiment not one gear wheel but two substantially similar gear wheels 150 are provided, the teeth 151 of which engage in respective ones of the rows of teeth of the rack 130.

The gear wheels 150 are fitted onto an output drive shaft 160 and thereby have a common axis of rotation. By a toothing 170, it is ensured that the gear wheel 150 is secured for rotation with the output drive shaft 160. Between the gear wheels 150, there is located a disk element 154, which is arranged coaxial with the gear wheels 150 and with the output drive shaft 160 and which is fixedly connected by the toothing 170 for rotation with the output drive shaft 160.

The disk element 154 comprises two disk segments 155, following one after the other in the axial direction, with substantially similar peripheries and a section of lesser periphery located between these disk segments (see in particular FIG. 7). The disk element 154 is, for example, produced from an annular disk of sufficient axial length, by an annular slot being cut in the disk over about half the axial length from the periphery, at both sides of which the disk segments 155 then remain.

The disk element 154 has near its periphery a boring 159 extending through both disk segments 55 parallel to the axis of rotation of the disk element 154. This boring 159 serves, as described in greater detail below, to receive a bolt 156.

The output drive shaft 160 is journalled at an end section 164 by means of a sleeve 167 in a cap-like housing element 102, which extends around the periphery of and covers the end of the end section 164. The housing element 102 is inserted into a corresponding opening in the housing 100 and bolted thereto. On the opposite side of the housing 100, there is provided a similar housing element 103, which extends around the output drive shaft 160 with a sleeve located therebetween and which is likewise bolted to the housing 100. The other end section 163 of the output drive shaft 160 projects through this housing element 103 from the housing. A pivotation arm 180 is non-rotatably fitted on this end section 163 and secured by a nut.

As FIG. 6 shows, there is furthermore located within the housing 100 a gas compression spring 134 which, by means of a bolt 132, is pivotally mounted on the inner side of the housing 100. The gas compression spring 134 is provided with an actuating rod 148 which can be extended and retracted under the damping and spring effect of the gas compression spring 134.

The reduced diameter free end of the actuating rod 148 is inserted through a transverse boring 157 in the bolt 156 and is secured against removal therefrom, at its free end, by means of a retainer ring 158.

For assembling this pivotation device, the fixed piston plate 136 is firstly fixed onto the guide rod 120 and the cylinder 137 is then assembled around the fixed piston plate 136 by securing the sealing and guide plates 132 and 133 to the cylindrical wall 140. The rack 130 is formed, in the illustrated embodiment, in one piece with the cylindrical wall 140, but can, however, be secured as a separate part thereto; this securement would, in that case, preferably be effected before the assembly of the guide rod 120 and the cylinder 137 in the housing 100.

The arrangement of the guide rod 120 and the cylinder 137 is then inserted, through the opening provided therefor, into the housing 100 and the guide rod 120 is inserted at one end thereof into the boring provided therefor in the housing 100. Subsequent application of the housing element 101 and the reception of the other end of the guide rod 120 in the corresponding boring completes this constructional step.

The bolt 156 is then inserted through the boring 159 of the disk element 154. The disk element 154 is subsequently brought through an opening remaining in the housing 100 into its position, in which the disk element 154 is located in the longitudinal recess of the rack 130. The drive shaft 160 can then be slid into the central axial opening of the slide element 154 so that the toothing provided effects a non-rotational engagement. The gears 150 are then slid from respective ends of the drive shaft 160 until they abut the disk element 154. In this position, the ends of the gear wheels 150 facing the disk element 154 prevent the bolt 156 from being able to be moved out from the boring 159 of the disk element 154 in the axial direction.

It is subsequently only necessary for the gas compression spring 134 to be inserted and for the housing elements 102, 103 to be slid onto the drive shaft 160 and bolted to the housing 100. The pivot arm 180 can then be fixed onto the drive shaft 160, which completes the assembly of the pivotation device.

The operation of this embodiment of the pivotation device is described below with reference to FIG. 6. In the initial position, the cylinder 137 is located in one limit position (the upper position shown in FIG. 6); the working chamber 146 is filled with fluid and has its maximum volume. The other working chamber 147 is empty of fluid and has its minimum volume.

The gas compression spring 134 acts through the partially extended actuating rod 148 on the disk element 154 and, therewith, on the output drive shaft 160 in a direction which would pivot the pivotation arm 180, located horizontally in FIG. 6, in the downward direction. This pivotation is, however, not possible due to the toothed engagement of the gear wheels 150 with the rack 130, since the cylinder 137 is located in the end position of its working stroke corresponding to this pivotation movement. This fixed piston plate 136 prevents a further movement of the cylinder 137 in this direction; additionally, such a movement is prevented by the projection on the housing element 101 which is shown in FIG. 6. Then, through the connection 143 and the inflow and outflow passage 141 of the guide rod 120, a fluid under pressure is supplied which flows in through the boring 145 into the emptied working chamber 147. By the increasing pressure, the lower sealing and guide plate 133 of the cylinder 137 is forced away from the fixed piston plate 136. The cylinder 137 is moved downwardly, in FIG. 7, to the connection 143. Simultaneously, the fluid contained in the working chamber 146, which is not pressurized, is forced outwardly through the boring 144 and the inflow and outflow passage 139 and through the connection 142 and, through a suitable valve, is exhausted to the surroundings. By this downward movement of the cylinder 137, the rack 130 rotates the gear wheels 140 and, therewith, the output drive shaft 160. The pivotation arm 180 is swung upwardly in FIG. 6. This effects, according to the assembly conditions, the pivotation of the centrifugal chain assembly to the vehicle tire or away therefrom.

During this movement, the actuating element 148 is pushed into the gas compression spring 134, for which purpose the resistance of the gas compression spring 134 must be overcome. At about half of the working stroke of the cylinder 137, i.e. when this cylinder has completed half of its downward movement, the actuating rod 148 is pushed back to the maximum extent into the gas compression spring 134, as indicated by the broken line intersecting the axis of rotation of the upper drive shaft 160 in FIG. 6. Upon further downward movement of the cylinder 137, no oppositely directed force of the gas compression spring 134 has to be overcome; furthermore, the spring force of the gas compression spring 134 then acts in the same direction as the compression force of the cylinder 137. However, the damping by the gas compression spring 134 ensures that the last part of the cylindrical movement is not more substantially accelerated and, instead, a gentle, braked movement into the lower end position of the cylinder 137 occurs.

In this lower end position of the cylinder 137, the actuating rod 148 of the gas compression spring 137 lies, on the broken line shown in FIG. 6, to the right of the gear wheel 150 and the bolt 156 together with the free end of the actuating rod 148 lie within the longitudinal recess in the rack 130.

Since both end positions of the free end of the actuating rod 148 are spaced equidistantly from the opposite pivotation point 135 of the gas compression spring 134, while the position of the maximum spring loading of the gas compression spring 134 is passed between these end positions, this application of the gas compression spring 134 corresponds to an over dead-center mode of operation.

The return of the pivot arm 180 into its position shown in FIG. 6 takes place by a completely analogous reversal of the above-described operational steps. The connection 143 is opened to the surroundings, the connection 142 is connected to a fluid under pressure. While the piston 137 then moves upwardly, the working chamber 146 is enlarged at the expense of the working chamber 147, the fluid content of which can escape through the inlet and outlet passage 141.

The gas compression spring 134 is firstly compressed until its dead-point is reached; subsequently, it expands and therefore simultaneously brakes the movement of the piston 137 back into the end position shown in FIG. 6.

It is to be understood that, instead of the direct linking of the pivotation arm 180 to the upward drive shaft 160, in this case, also, the above-mentioned coupling can be effected by a bevel gearing.

We claim:

1. A pivotation device for adjustably pivoting an arm of a centrifugal chain assembly, said pivotation device comprising:
   a drive;
   a rack;
   means interconnecting said rack and said drive, said rack being longitudinally driveable by means of said drive;
   a gear wheel in engagement with said rack;
   an output drive shaft driven by a said gear wheel;
   the axis of rotation of said output drive shaft coinciding with that of said gear wheel;
   a coupling means adapted to interconnect said output drive and said pivotation arm
   a guide rod of circular cross section extending parallel to said rack; and
   means interengaging said rack and said guide rod, said rack being guided in a flying manner by said guide rod, said rack having teeth facing away from said guide rod, teeth of said gear wheel cooperating with teeth of said rack to prevent rotation of said rack about said guide rod.

2. The pivotation device of claim 1 further comprising a spring element connected to said rack and preloading said rack in a direction opposite that in which said rack is driven by said drive.

3. The pivotation device of claim 2 in which said spring element is a gas compression spring.

4. The pivotation device of claim 1 in which said rack has at least one projection on its side facing away said teeth, said projection engaging said guide rod with a sliding fit.

5. The pivotation device of claim 1 in which said drive includes a push rod coupled to said rack.

6. The pivotation device of claim 5 in which said rack has a bore formed therein and said push rod extends into said bore in the axial direction of said rack.

7. The pivotation device of claim 6 in which said bore in said rack is a first blind hole, said rack further having a second blind hole extending opposite said first blind hole, one end of said spring element being supported in said second blind hole.

8. The pivotation device of claim 7 in which substantially the entire length of said spring element is disposed within said second blind hole.

9. The pivotation device of claim 1 which said rack is substantially rectangular in cross section.

10. The pivotation device of claim 1 in which said coupling means between said output drive shaft and said pivotation arm comprises a bevel gearing.

11. The pivotation device of claim 10 further comprising a bevel gear housing having an annular flange extending concentrically about the axis of said output drive shaft and including peripheral wedge surfaces said pivotation device including a main housing provided with a second annular flange having peripheral wedge surfaces in engagement with the annular flange of said bevel gear housing, and a clamping ring for tightening said flanges.

12. The pivotation device of claim 2 further comprising a cylinder slideably mounted upon said guide rod said rack being disposed on the exterior of said cylinder, said cylinder having inlet and outlet fuid passages through which a fluid for actuating said cylinder can be supplied.

13. The pivotation device of claim 12 further comprising a fixed piston plate mounted upon said guide rod, said piston plate being disposed within said cylinder in engagement therewith, said piston plate dividing the interior of said cylinder into two working chambers, said inflow and outflow passages communicating respectively with said working chambers.

14. The pivotation device of claim 13 in which said inlet and outlet passages comprise axial borings communicating with lateral openings in said guide rod.

15. The pivotation device of claim 12 in which said spring element is interconnected to said gear wheel and passes through a position of maximum spring loading at an intermediate position of said cylinder.

16. The pivotation device of claim 15 comprising of first and second gear wheels mounted in a coaxial spaced relationship upon said output drive shaft, said wheels engaging said rack, and a coaxial disc member mounted between said gear wheels for rotation therewith, said spring element being eccentrically connected to said disc element.

17. The pivotation device of claim 16 further compromising a housing, a journal member releasably secured to said housing, said output drive shaft having an end section received in said journal member said output shaft further having a means carried adjacent the middle portion thereof for receiving said gear wheels and disc member in non-rotatable engagement.

* * * * *